(12) United States Patent
Kvorning

(10) Patent No.: US 10,706,700 B2
(45) Date of Patent: Jul. 7, 2020

(54) PRIORITIZATION OF VIDEO SOURCES

(71) Applicant: CANON KABUSHIKI KAISHA, Tokyo (JP)

(72) Inventor: Christian Bergholdt Kvorning, Brønshøj (DK)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/330,727

(22) PCT Filed: Sep. 8, 2017

(86) PCT No.: PCT/EP2017/072647
§ 371 (c)(1),
(2) Date: Mar. 5, 2019

(87) PCT Pub. No.: WO2018/046693
PCT Pub. Date: Mar. 15, 2018

(65) Prior Publication Data
US 2019/0228625 A1    Jul. 25, 2019

(30) Foreign Application Priority Data
Sep. 9, 2016 (GB) .................................. 1615388.4

(51) Int. Cl.
H04N 5/77 (2006.01)
G08B 13/196 (2006.01)
(Continued)

(52) U.S. Cl.
CPC . G08B 13/19667 (2013.01); G08B 13/19669 (2013.01); G08B 13/19676 (2013.01);
(Continued)

(58) Field of Classification Search
CPC ........ G08B 13/19667; G08B 13/19669; H04N 5/77; H04N 5/783
See application file for complete search history.

(56) References Cited

U.S. PATENT DOCUMENTS 8,350,907 B1    1/2013  Blanco et al.
2003/0097532 A1*  5/2003  Montgomery ... G08B 13/19669
                                                    711/154
(Continued)

FOREIGN PATENT DOCUMENTS

WO    00/45296 A1    8/2000
WO    2009/039446 A1  3/2009

*Primary Examiner* — Tsion B Owens
(74) *Attorney, Agent, or Firm* — Canon U.S.A., Inc. IP Division

(57) ABSTRACT

An apparatus for managing the storage of image data captured by a plurality of image capturing means is provided. The apparatus comprises designation means configured to receive a designation of the importance of at least one of the plurality of image capturing means; first storage means configured to store the captured image data; determining means configured to determine the availability of a second storage means to which image data stored on the first storage means is to be transferred, and to determine the available storage space of the first storage means; image data control means configured to transmit a control command to at least one of the plurality of capturing means and first storage means; and in the case that it is determined that the second storage means is unavailable, and the available storage space of the first storage means is determined to be less than a predetermined threshold, the image data control means is configured to transmit the control command to the at least one of the plurality of image capturing means and the first storage means to control the respective means so as to reduce the amount of captured image data stored on the first storage means in accordance with the designation of the importance of the at least one of the plurality of image capturing means.

28 Claims, 7 Drawing Sheets

(51) Int. Cl.
  *H04N 5/783* (2006.01)
  *H04N 7/18* (2006.01)
  *G11B 27/031* (2006.01)
  *G11B 27/36* (2006.01)

(52) U.S. Cl.
  CPC ............ *G11B 27/031* (2013.01); *G11B 27/36* (2013.01); *H04N 5/77* (2013.01); *H04N 5/783* (2013.01); *H04N 7/18* (2013.01); *H04N 7/181* (2013.01)

(56) References Cited

U.S. PATENT DOCUMENTS

2004/0226046 A1   11/2004   Weng et al.
2014/0313336 A1   10/2014   Predmore, II
2014/0341531 A1* 11/2014   Chen .................... H04N 9/7921
                                             386/228
2015/0264320 A1    9/2015   Yuki

* cited by examiner

PRIORITIZATION OF VIDEO SOURCES

FIELD OF THE INVENTION

The present invention relates to a surveillance system. In particular, the present invention relates to the prioritization of video sources within a surveillance system.

DESCRIPTION OF THE RELATED ART

Surveillance systems and video surveillance systems in particular have become ubiquitous in modern society and are used for observing an area or a number of areas across a property, city and even road networks.

It is known for video surveillance systems to temporarily store captured video data on a primary server. Captured video data can be retained over an extended period of time by performing, for example, a daily archiving operation in which all video data captured over a predetermined period of time and temporarily stored on the primary server is transferred to an archive server for retention.

The archive server on which the video data is archived or retained is not immune from operational error, and occasionally the archive server may become unavailable due to, for example, the server requiring maintenance work or a reboot, or the server might fail entirely. In such a case, the video data captured and stored on the primary recording server cannot be archived for retention during the period in which the archive server is unavailable. The primary server typically has a smaller storage capacity than that of the archive server due to the expense of providing a large storage capacity. Because the storage capacity of the primary server is small the primary server might therefore reach its full storage capacity in a short period of time. However, the primary server may not have a smaller storage capacity than that of the archive server. Accordingly, using such a primary server may be problematic if the archive server is unavailable for a long period of time.

SUMMARY OF THE INVENTION

According to a first aspect of the invention there is provided a system for managing the storage of captured image data as provided in claims 1 to 8.

According to a second aspect of the invention there is provided a method for managing the storage of captured image data as provided in claims 9 to 16.

According to a third aspect of the invention there is provided a program for managing the storage of captured image data as provided in claim 17.

According to a fourth aspect of the invention there is provided a computer-readable storage medium storing a program for managing the storage of captured image data as provided in claim 18.

Embodiments of the present invention will now be described, by way of example only, with reference to the accompanying drawings. Each of the embodiments of the present invention described below can be implemented solely or as a combination of a plurality of the embodiments or features thereof where necessary or where the combination of elements or features from individual embodiments in a single embodiment is beneficial.

DESCRIPTION OF THE EMBODIMENTS

First Embodiment

Figure 1:
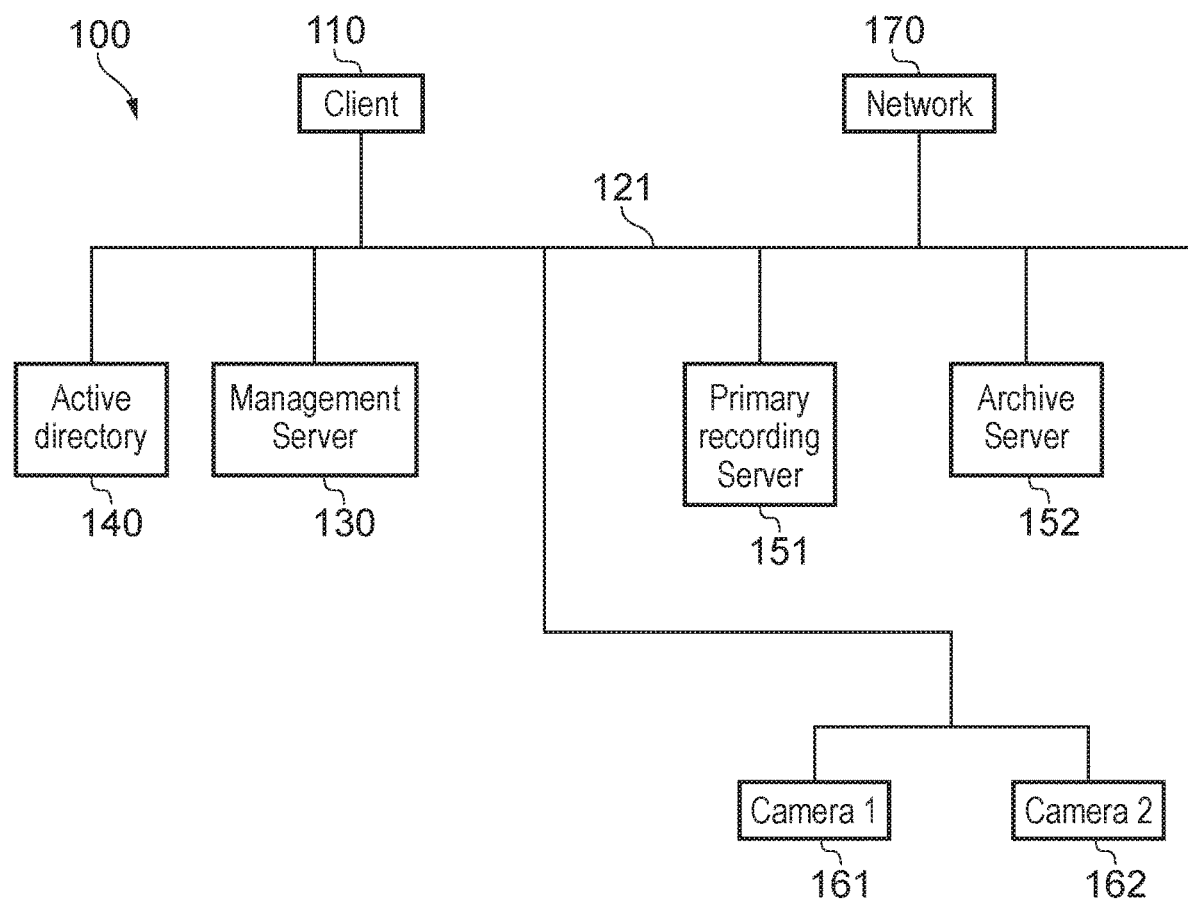
FIG. 1 is a block diagram illustrating an example of a surveillance system.

A video surveillance system 100 as illustrated in FIG. 1 comprises a client terminal 110, recording server 151 (storage means), archive server 152, a plurality of cameras 161-162 (video sources or capturing means), management server 130, gateway 170 to an external network, and network/bus 121. A video surveillance system 100 will typically include a large number of cameras 161-162.

The client terminal 110 is provided for use by a user in order to monitor or review the video data, or captured images, of the cameras 161-162. The client 110 is configured to communicate via the network/bus 121 with the management server 130, recording server 151, the archive server 152, and the plurality of cameras 161-162. The video surveillance system 100 can input and output data via the gateway 170 to an external network.

The primary recording server 151 is the primary server for storing video data which is captured by the cameras 161-162. The primary recording server (or short term storage) 151 stores the captured video data before it is transferred to the archive server (or long term storage) 152 for archiving or retention. Further, the system 100 is for illustrative purposes only and any number of cameras and servers may be provided.

The management server 130 stores settings which are to be applied to the video surveillance system 100. For example, the management server 130 might store settings which determine how the primary recording server 151 should operate. Further, the management server 130 is able to control user log-in and access to the video surveillance system.

Figure 2:
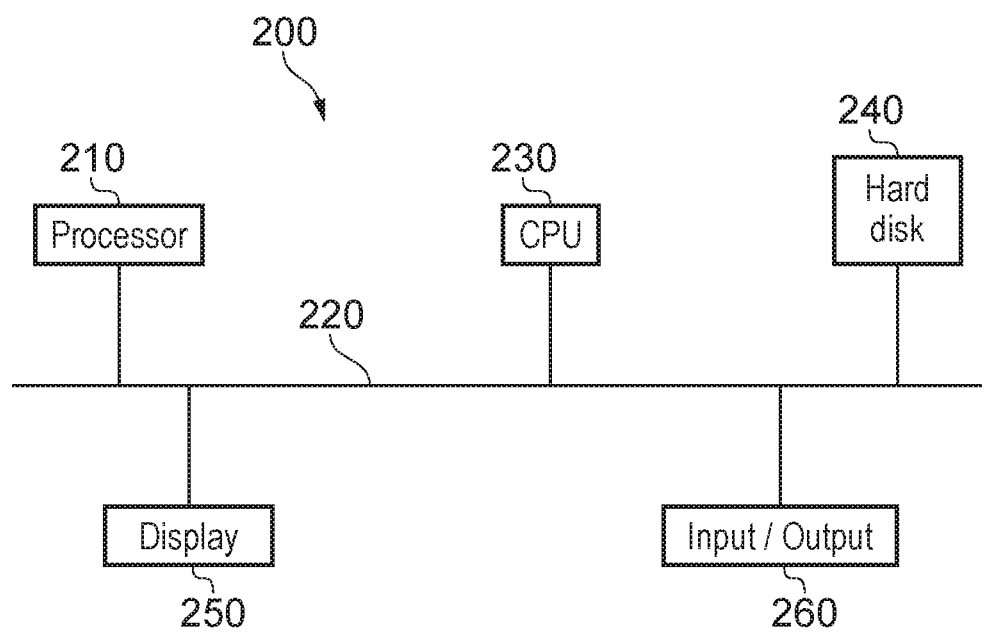
FIG. 2 is a block diagram illustrating a typical arrangement for a computer 200.

The client terminal 110, the management server 130, and the primary recording server 151 have a system architecture consistent with the computer shown in FIG. 2. The architecture shown in FIG. 2 is greatly simplified and any suitable computer architecture may be used.

FIG. 2 illustrates a typical arrangement for a computer 200. A processor 210 is configured to communicate via a bus 220 with a central processing unit (CPU) 230, a hard disk 240, and a display 250. An input/output port 260 is configured so that the computer 200 can communicate with external devices.

The processor 210 is used to control the analysis of data performed by the CPU 230. Data is stored in the hard disk 240. The display 250 is used to convey information to the user, which is achieved using a monitor for example. The input/output port 260 receives data from other devices, transmits data via the network, and allows a user to give instructions to the computer 200 using a mouse and a keyboard.

Figure 3:
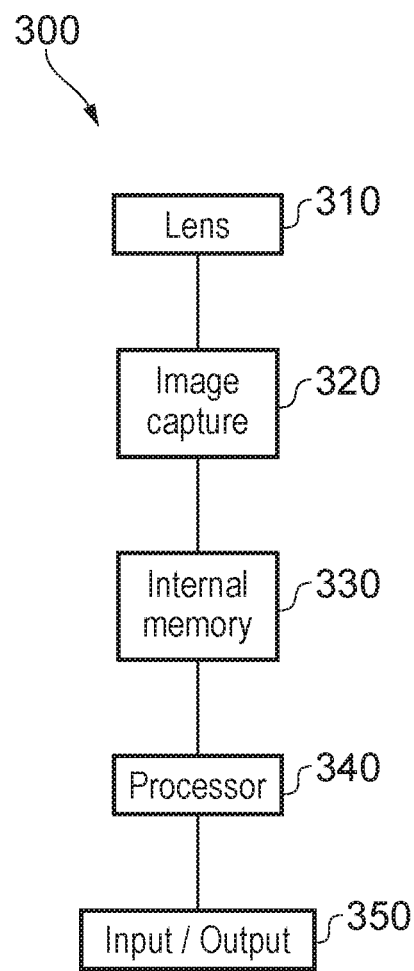
FIG. 3 is a block diagram illustrating a typical arrangement for a camera 300.

The plurality of cameras 161-162 have the hardware configuration generally described in connection with FIG. 3. FIG. 3 shows an example arrangement for a camera 300, which comprises a lens 310, an image capture device 320, an internal memory 330, a processor 340, and an input/output port 350.

The lens 310 is used to transmit light to the image capture device 320, and the resulting image is stored in the memory 330. The processor 340 is used to instruct the camera 300 to capture the image, modify the image, and store the image in the memory 330. The processor 340 is used to transmit and receive data via the input/output port 350.

The camera types may vary. For example, the plurality of cameras 161-162 might be any one of or a combination of a pan-tilt-zoom (PTZ) camera, 360 degree camera, or any other type of camera known in the art. The main feature is that the cameras 161-162 send a stream of video data to at least the primary recording server 151 for storage.

Video data is transmitted from the cameras 161-162 to the primary recording server 151. Video Management Software (VMS) provides a user interface on client terminal 110 which permits for live and/or stored video data to be displayed on client terminal 110. The VMS also permits other interaction between a user and the stored or live video data such as zooming or editing for example.

As discussed, the primary recording server 151 is a server for temporarily storing video data (short term storage) captured by and received from the cameras 161-162. This video data is archived to the archive server 152 (long term storage) on a regular basis and is an operation which can be performed as frequently as a user desires. In the case that the archive server 152 becomes unavailable or "drops out" the video data captured by the cameras 161-162 and which is stored on the primary recording server 151 cannot be transferred to nor archived to the archive server 152.

The primary recording server 151 has a storage capacity which is sufficiently large so that it can store hours of video data captured by the plurality of cameras 161-162, this will typically include enough storage capacity to store at least one or two full days of video data, for example. However, the storage capacity of the primary recording server 151 is not limited to such a period. It is only necessary for the primary recording server 151 to allow for video data captured over a required period of time to be stored temporarily before an archiving operation takes place.

The archive server 152 may become unavailable or "drop out" for any number of reasons. For example, it might be due to a failure of the server, or the server being taken "offline" for maintenance work or a reboot.

The limited storage capacity of the primary recording server 151 is typically sufficient for when a standard maintenance procedure is carried out on the archive server 152. However, in other situations such as a failure of the archive server 152, for example, when the archive server 152 may be unavailable for a period of time which is longer than a period in which, for example, one or two archiving sessions might normally take place then the storage capacity of the primary recording server 151 can become problematic.

That is, in the case of unavailability of the archive server 152, the primary recording server 151 can quickly reach its storage capacity and data loss may occur if the archive server 152 is not back "on line" at the point of the primary recording server 151 reaching full storage capacity. The loss of video data due to the limited storage capacity of the primary recording server 151 might occur, for example, because part of the non-archived video data stored on the primary recording server 151 is deleted in order to create storage space for the newly captured video data resulting in the loss of video data which has been previously stored, or, alternatively, the previously stored video data might not be deleted and in such a case this will result in the newly captured video data being lost because there is no storage space available to store the newly captured video data.

The embodiment aims to mitigate or avoid such a scenario where data loss of video data captured by the plurality of cameras 161-162 may occur at a time when the archive server 152 is unavailable.

According to an operation of the first example a user is able to set or designate a priority order for the plurality of cameras 161-162 within the video surveillance system 100. Such designation allows for the video data which is stored, or video data which is to be stored, on the primary recording server 151 to be reduced according to a priority order of the plurality of cameras 161-162. An explanation as to how the video data is reduced is explained later.

Figure 4:
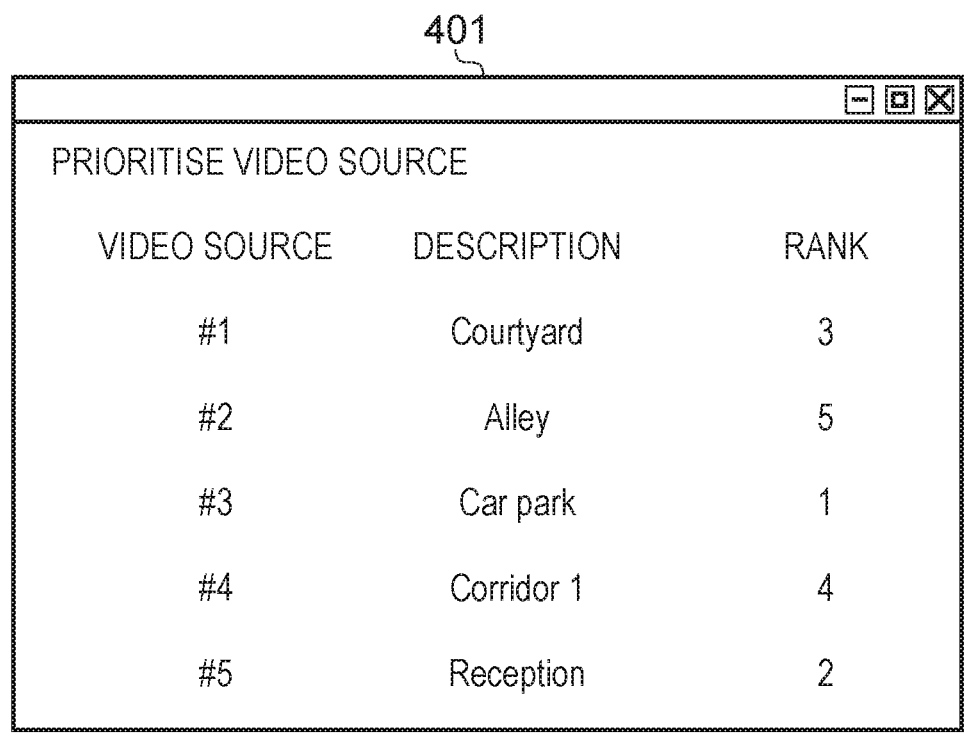
FIG. 4 illustrates a user interface for designating an order of priority for video sources within a system.

FIG. 4 illustrates an example of a user interface 401 which a user can access as part of the VMS. The user interface 401, or designation means, allows a user to designate a priority order which sets a level of importance for each of the plurality of cameras 161-162 within the video surveillance system.

The user is able to access the user interface 401 on demand such that the priority order of the plurality of cameras 161-162 can be changed at any time. A user might, for example, wish to create the priority order when the video surveillance system 100 is initially set up. Further, the user of the video surveillance system 100 might want to change the priority order when a new camera is installed as part of the system 100 because the newly installed camera captures video data of an area which is of particular importance or interest. Alternatively, the user might want to change the priority order because a camera which is already established in the system 100 captures video data of an area which has recently become particularly interesting to the user.

The priority order might be based according to the location of the camera 161-162 and/or the scene which the camera 161-162 captures as discussed above. However the priority order might also be based on the quality of the video data captured by each camera, or by the specification of the video cameras 161-162, for example. How the cameras 161-162 are prioritised is a decision which can be made by the user, but it is important to be able to prioritise or rank the cameras 161-162 according to a criteria as defined by the user. FIG. 4 provides an illustrative example where a user has prioritised the cameras 161-162 within a system 100. It can be seen from FIG. 4 that a user has ranked the importance of 5 video sources (cameras), with the video source which captures video data of a car park being ranked as most important (1) and the video source which captures video data of an alley being ranked as least important (5). As illustrated, each video source has been provided with a unique number which represents the importance of each video source, but a user might optionally decide to allocate different video sources with a common number such that the importance of those different video sources is marked as being equivalent. A numerical prioritization is provided but the video source may be ranked according to any method which is capable of indicating an order of priority.

After a user has designated a priority order for the plurality of cameras 161-162 within the video surveillance system 100, video data is captured and stored in a typical manner. That is, video data is captured by each of the plurality of cameras 161-162 and temporarily stored on the primary recording server 151 before it is to be archived by being transferred to the archive server 152.

The captured video data is only temporarily stored on the primary recording server 151 until the regular archiving operation takes place at which point the video data is transferred to the archive server 152. However, in the case that the archive server 152 becomes unavailable for any of the reasons mentioned above, then it is required that the captured video data remains stored on the primary recording server 151 until the archive server 152 becomes available again.

The operation of the video surveillance system 100 will now be described with reference to the flowchart shown in FIG. 5.

At step S501 video data captured by each of the plurality of cameras 161-162 (video sources) within the video surveillance system 100 is acquired.

At step S502 it is determined whether or not it is time for the archiving operation to be performed. If it is determined that it is not time for the archiving operation to be performed ("No") then processing proceeds to step S505. However, if it is determined that it is time for the archiving process to be performed then the processing proceeds to step S503 where it is determined whether or not the archive server 152 is available for archiving the captured video data which is temporarily stored on the primary recording server 151.

If, at step S503, it is determined that the archive server 152 is available ("Yes"), the operation proceeds to step S504 where the video data stored on the primary recording server 151 is transferred to the archive server 152. Having performed the archiving operation the operation returns to step S501 so that more video data is acquired from the plurality of cameras 161-162.

If, however, at step S503, it is determined that the archive server 152 is not available ("No"), the operation proceeds to step S505. At step S505 the primary recording server 151 (determining means) checks the storage capacity of the primary recording server 151 in order to provide information on how much capacity remains for storing the acquired video data on the primary recording server 151.

In the case that the storage capacity remaining on the primary recording server 151 is determined as not being equal to or less than a predetermined threshold (a "No" determination) the operation proceeds to step S506 where the acquired video data is stored on the primary recording server 151. Having stored the video data captured at step S501 on the primary recording server 151 the operation returns to step S501 so that more video data is acquired from the plurality of cameras 161-162.

However, if, at step S505, it is determined that the storage capacity remaining on the primary recording server 151 is equal to or less than the predetermined threshold (a "Yes" determination) the operation proceeds to step S507.

At step S507 the priority order of the plurality of cameras 161-162 as specified by the user is referenced and video data settings related to the video camera (or cameras) which is/are considered to be least important are changed in order to reduce the video data which is to be stored on the primary recording server 151. It is possible that a number of video cameras are considered to be least important and in such a case the video data settings of, for example, two or three video cameras 161-162 are changed in order to reduce the video data which is to be stored on the primary recording server 151. Of course this is dependent on settings as specified by a user using the user interface 401.

In the present embodiment the video data which is changed as a result of a "Yes" determination at step S505 is changed by reducing the frames per second, or frame rate. However, a number of known methods might be employed to reduce the amount of video data to be stored on the primary recording server 151. Other methods might include changing parameters associated with cameras 161-162 and or video data such as, for example, image resolution and compression ratio in order to reduce the amount of video data for the designated least important camera/s that is to be stored on the primary recording server 151.

By reducing the video data for the designated least important camera a reduction in video data to be stored can be achieved. For example, the frame rate might be changed from 60 fps to a lower frame rate of 15 fps. Such a change might affect video smoothness but it has the desired result of decreasing the amount of video data which is required to be stored on the primary recording server 151.

At step S508 the reduced video data is stored on the primary recording server 151. Storage of this video data at a reduced frame rate, for example, results in the video data acquired from the designated least important camera (or cameras) requiring less storage capacity compared to the video data which is associated with the more important cameras within the video surveillance system 100. Following a change of the frame rate, for example, of the designated least important camera (or cameras) the video data captured by the more important cameras is unaffected and the video data of the more important cameras continues to be captured at the same frame rate.

Accordingly, in the case that the archive server 152 is determined as unavailable and a remaining storage capacity of the primary recording server 151 is determined to be equal to or below a predetermined threshold, operation of the present embodiment can result in a larger proportion of the storage capacity of the primary recording server 151 being dedicated to video data acquired from the more important cameras within the video surveillance system 100.

The determination at step S505 has been described as determining whether or not the storage capacity is equal to or less than a predetermined threshold. Equally, the determination might be based on how much data is stored on the primary recording server 151 and the determination can be based on whether or not the amount of data stored on the primary recording server 151 is equal to or greater than a predetermined amount of data. Accordingly, it can be calculated how much storage remains on the primary recording server 151. What is important at step S505 is that an indication of the storage state of the primary recording server 151 is determined so that the system can make a decision as to whether or not a reduction in video data for the designated least important camera is required.

It will be understood that the operation of the video surveillance system 100, according to the above-described example, is largely controlled by the primary recording server 151. In particular, the management server 130 provides the primary recording server 151 with a number of settings which are applied to the primary recording server 151 in order to cause the primary recording server 151 to operate in a particular manner. For example, the primary recording server 151 itself monitors the storage capacity which remains on the primary recording server 151 and determines whether or not the remaining storage capacity is equal to or less than a predetermined threshold. Video data captured by the plurality of cameras 161-162 is sent, via the network 121, to the primary recording server 151. The primary recording server 151 receives video data from the plurality of cameras 161-162 and controls the video data of the cameras 161-162 which has been designated as least important in order to reduce the amount of video data which is to be stored on the primary recording server 151. In other words, the reduction of video data is performed at the primary recording server 151. Furthermore, according to the above-described example, it is the primary recording server 151 which controls (via settings applied from the management server 130) the operational steps S501 to S507 of the video surveillance system 100 as illustrated in FIG. 5. It should be noted that a further reduction of video date might take place when the video data which has been temporarily stored on the primary recording server 151 is transferred to the archive server 152. This however is not strictly necessary and it will depend on user's preferences, and also on the size of a user's archive server 152. What is important for the present application however, is that the video data stored on the primary recording server 151 during a time in which the video data cannot be archived to the archive server 152, the amount of video data stored on the primary recording server 151 can be reduced by changing the frame rate of the video data, for example.

This embodiment is able to reduce the amount of video data associated with a camera according to priority settings which are designated by a user of a surveillance system 100. The prioritization of video sources as described is able to mitigate or avoid the likelihood of important video data being lost due to insufficient storage at a time when an archive server 152 is unavailable.

Second Embodiment

A second embodiment of a video surveillance system will now be described with reference to FIG. 6.

Figure 5:
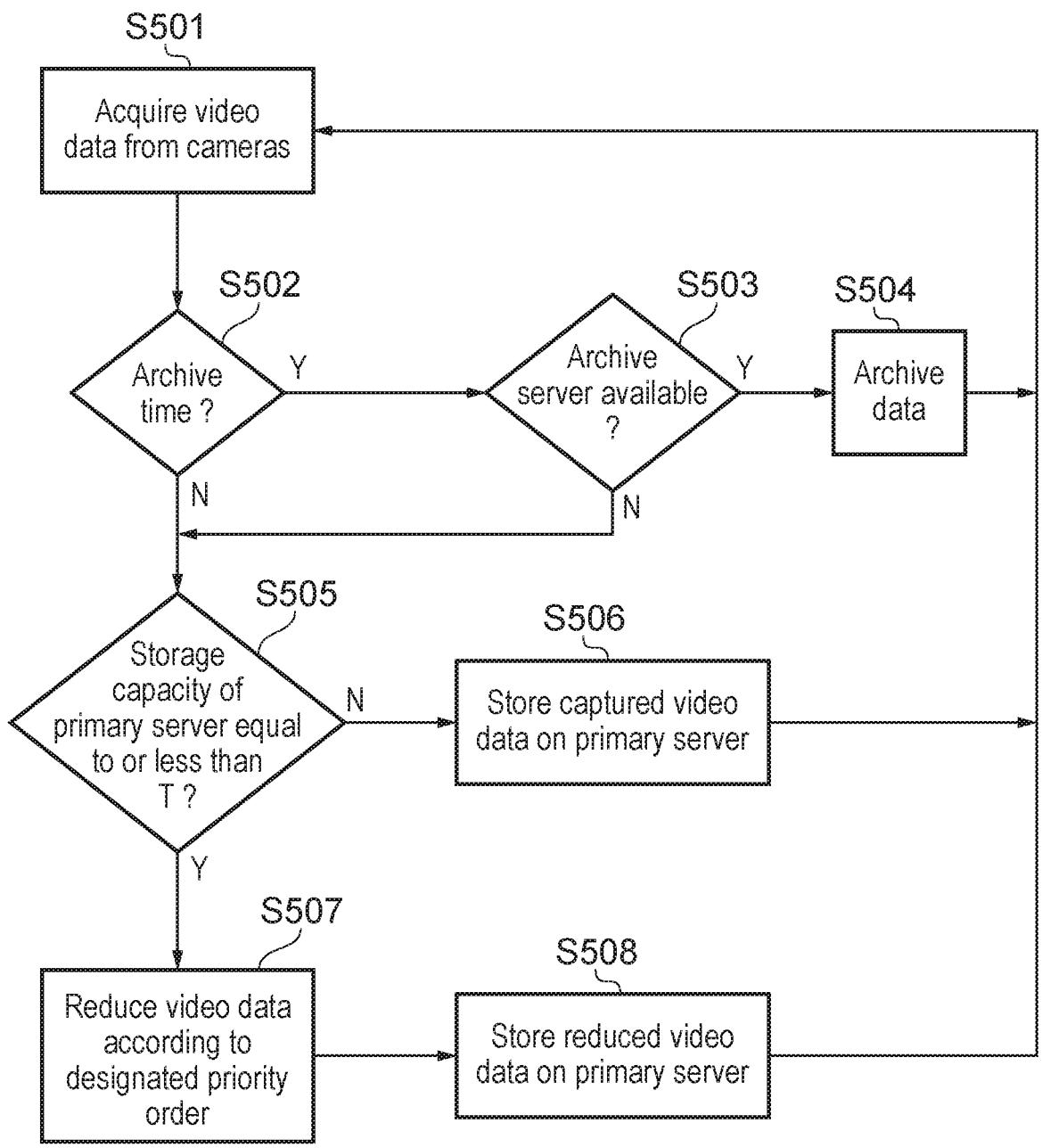
FIG. 5 is a flowchart illustrating a first embodiment.
Figure 6:
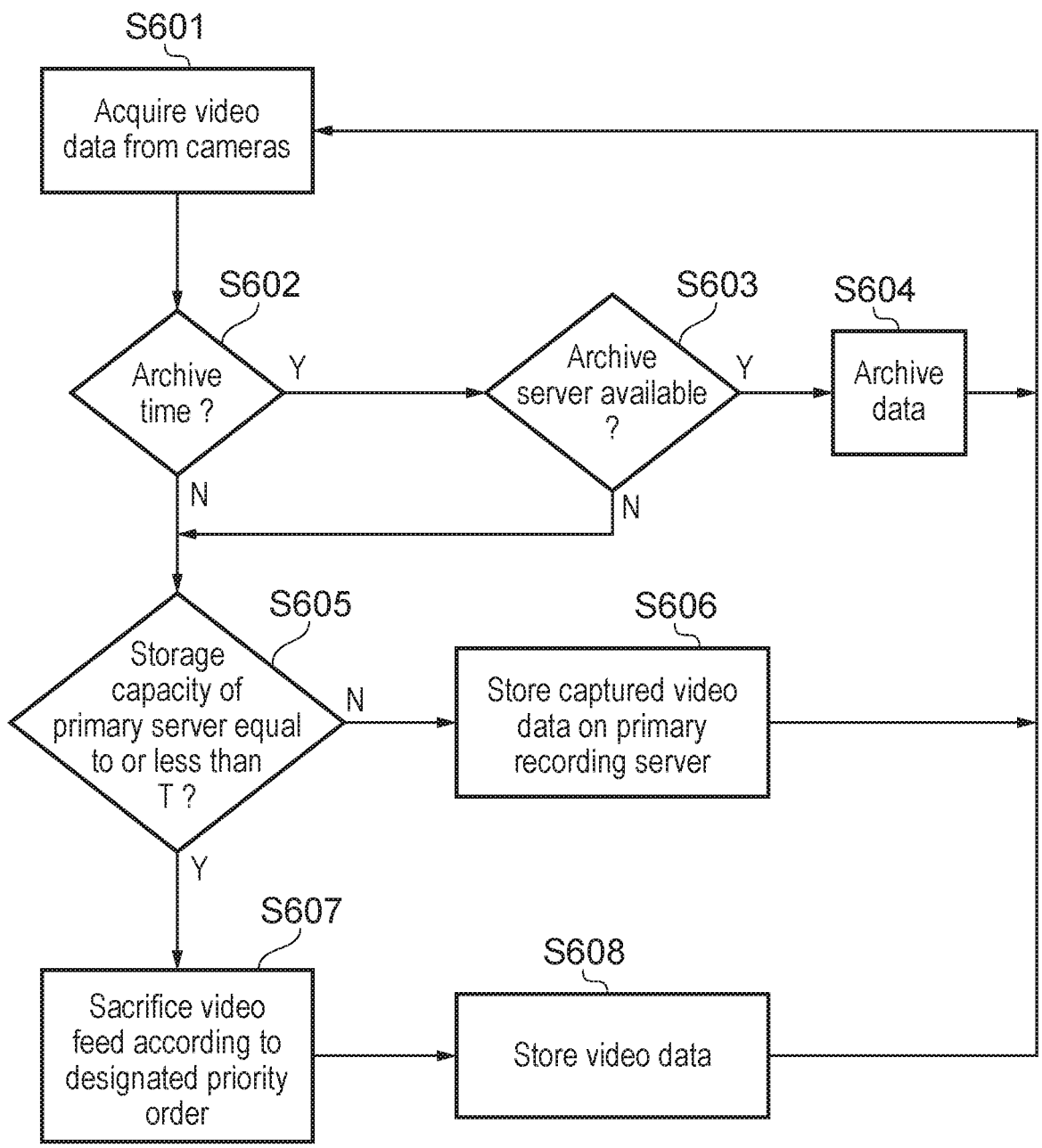
FIG. 6 is a flowchart illustrating a second embodiment.

Steps S601 to S606 of FIG. 6 corresponds to steps S501 to S506 of FIG. 5 so the explanation of these steps has not been reproduced for the second embodiment.

As is illustrated in FIG. 6, in the case that it is determined at step S605 that the storage capacity remaining on the primary recording server 151 is equal to or less than the predetermined threshold (a "Yes" determination) the operation proceeds to step S607.

At step S607 the priority order of the plurality of cameras 161-162 as specified by the user is referenced and the newly captured video data that is captured by the designated least important camera (or cameras) is no longer stored on the primary recording server 151. In other words, the video data that is newly captured by the designated least important camera (or cameras) is sacrificed and the newly captured video data associated with that camera is no longer stored. Video data which has been previously captured by the designated least important camera and has been previously stored on the primary recording server 151 is left untouched and remains to be stored on the primary recording server 151.

At step S608 the video data which is captured by the more important cameras continues to be stored on the primary recording server 151. In other words, all video data captured by cameras 161-162 apart from the video data captured by the designated least important camera (or cameras) continues to be stored on the primary recording server 151.

Such a configuration can be implemented by the primary recording server 151 changing settings such that the video data associated with the designated least important camera is no longer stored on the primary recording server 151, but the client terminal 110 does continue to receive and display the live stream for the designated least important camera.

Alternatively, the primary recording server 151 could send a command to the designated least important camera such that the designated least important camera is instructed to no longer capture and transmit video data. However, it should be noted that it is preferable for the newly captured video data to continue to be displayed as a live stream on the client terminal 110, even if this video data is no longer stored on the primary recording server 151.

According to the second embodiment, it is not important how the video surveillance system 100 handles video data captured by the cameras 161-162, but it is important that the video data captured by the camera (or cameras) which are designated as least important is no longer stored on the primary recording server 151 in the case that it is determined that the storage capacity on the primary recording server 151 is equal to or less than a predetermined storage capacity. By no longer storing such video data, more of the remaining storage capacity of the primary recording server 152 can be dedicated to video data captured by the cameras 161-162 which are considered more important.

It should be noted that in the second embodiment the video data captured by the least important camera/s which has previously been captured and stored on the primary recording server 151 remains on the primary recording server 151, but from the point that it is determined that the storage capacity of the primary recording server 151 is equal to or less than a predetermined capacity the video data captured by the designated least important camera/s is no longer required to be stored.

Third Embodiment

In a third embodiment of the video surveillance system 100, in contrast to the second embodiment, at step S607 already recorded video data of the designated least important camera/s on the primary recording server 151 is deleted in the case that it is determined at step S604 that the storage capacity of the primary recording server 151 is equal to or less than a predetermined threshold.

The video surveillance system 100 of the third embodiment is also different from the second embodiment because the video surveillance system 100 is further configured such that the primary recording server 151 will continue to receive live video data from the designated least important camera (or cameras) and the newly received video data from the designated least important camera will continue to be stored on the primary recording server 151. As such, according to the third embodiment, historic video data which had been captured by the designated least important camera (or cameras) is deleted in order to create room on the primary recording server 151 for the video data which is newly captured. The third embodiment has been described as deleting previously stored video data such that more storage room is created for storing the newly captured video data of cameras 161-162. The newly captured video data that is to be stored on the primary recording server 151 includes the newly captured video data of the designated least important camera.

Alternatively, after deletion of video data has occurred, storage of the newly captured video data of the designated least important camera might stop and the captured video data associated with this camera is no longer stored on the primary recording server 151. However, and in any event, the newly captured video data of the designated least important camera preferably continues to be displayed on the client terminal such that a user of the video surveillance system is still able to watch the video data 'live' regardless of whether or not the newly captured video data of the designated least important camera continues to be stored on the primary recording server 151.

In the third embodiment, newly captured video data continues to be displayed 'live' on the client terminal even in the event that the newly captured video data is not stored.

Fourth Embodiment

In a fourth embodiment the video surveillance system 100 is configured to monitor the primary recording server 151 according to two different thresholds, and in the case that the storage capacity of the primary recording server 151 is equal to or less than the respective threshold then a different technique of reducing video data to be stored on the primary recording server 151 is employed. The fourth embodiment describes a two-staged approach to reducing video data which is to be stored on the primary recording server 151.

Figure 7:
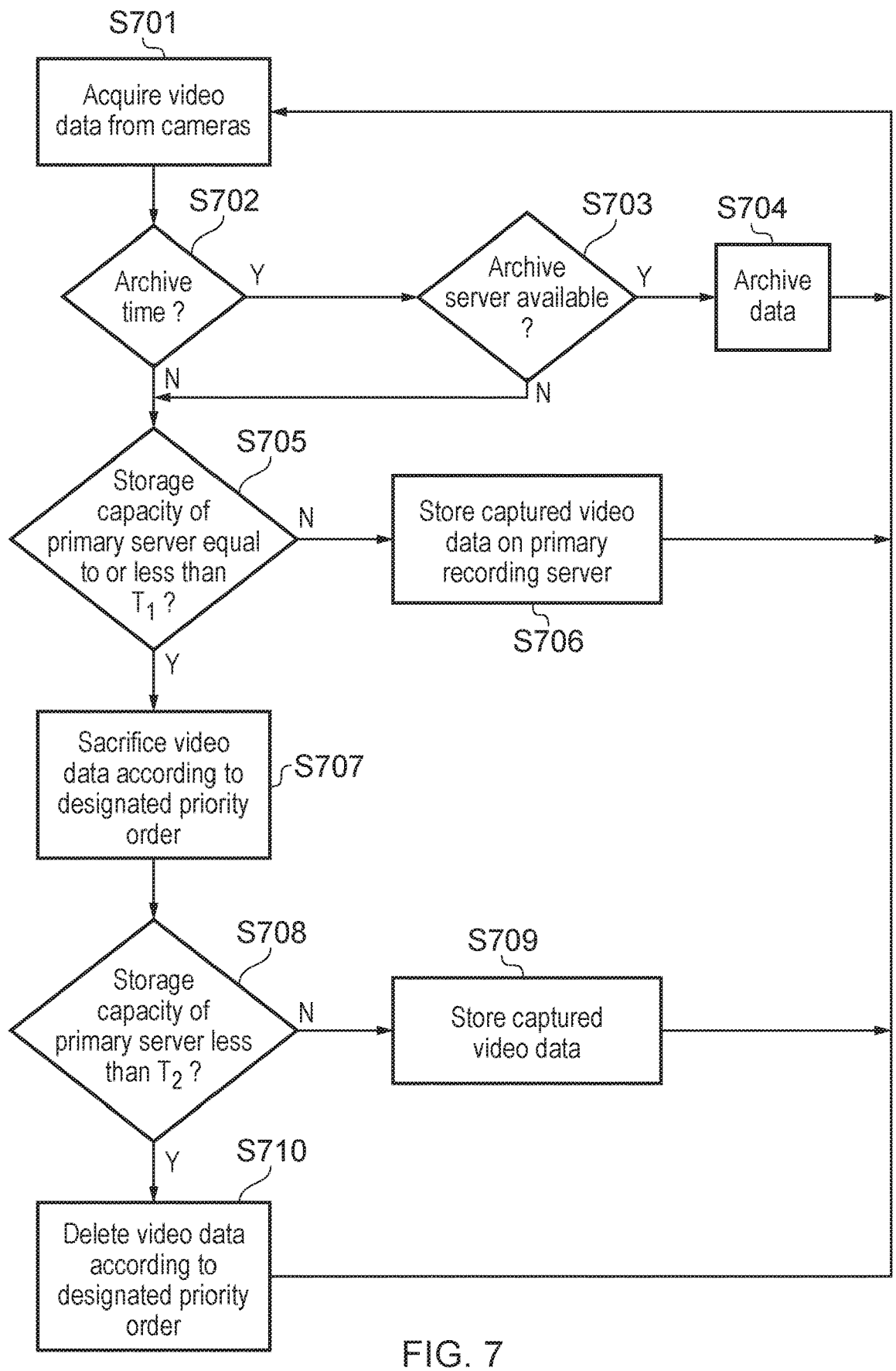
FIG. 7 is a flowchart illustrating a fourth embodiment.

The fourth embodiment of the video surveillance system 100 is illustrated in FIG. 7. Steps S701 to S706 of FIG. 7 correspond to steps S501 to S506 of FIG. 5 so the explanation of these steps has not been reproduced for the fourth embodiment.

As is illustrated in FIG. 7, in the case that it is determined at step S705 that the storage capacity remaining on the primary recording server 151 is equal to or less than a predetermined threshold T1 (a "Yes" determination) the operation proceeds to step S707. Step S707 is the equivalent of step S607 of FIG. 6 of the second example. Namely, once the primary recording server 151 identifies that the storage capacity of the primary recording server 151 is equal to or less than the predetermined threshold T1 then the video data which is captured by the camera/s designated as least important is no longer stored on the primary recording server 151. By no longer storing such video data, more storage capacity of the primary recording server 151 can be dedicated to video data captured by the cameras 161-162 which are considered most important.

At step S708 the storage capacity of the primary recording server 151 is once again monitored in order to establish whether the storage capacity of the primary recording server 151 has been reduced to a capacity which is equal to or less than a second predetermined threshold T2. In the case that it is determined at step S708 that the storage capacity remaining on the primary recording server 151 is not equal to or less than a predetermined threshold (a "No" determination) the operation proceeds to step S709 where the video data acquired for the designated most important cameras 161-162 continues to be stored on the primary recording server 151.

However, if, at step S708, it is determined that the storage capacity remaining on the primary recording server 151 is equal to or less than the predetermined threshold T2 (a "Yes" determination) the operation proceeds to step S710.

At step S710 the priority order of the plurality of cameras 161-162 as specified by the user is referenced once again and video data deletion occurs on the primary recording server 151 so that historic video data of the designated least important cameras which had been captured and stored prior to step S707 (sacrifice of the designated least important camera/s) is entirely deleted from the primary recording server 151 (as is the case in the third example). As a result of the video data deletion at step S710 the available storage capacity of the primary recording server 151 has been increased because video data of the designated least important camera (or cameras) which previously occupied part of the primary recording server 151 is deleted.

In other words, the fourth embodiment of the video surveillance system 100 employs a two-staged approach in ensuring that the video data which is captured by the designated most important camera (or cameras) has a storage priority over the video data which is captured by the designated least important camera (or cameras).

Firstly, in the case that a first predetermined threshold (T1) is met, the video data of the designated least important camera (or cameras) is no longer captured with the purpose of it being stored on the primary recording server 151. Secondly, and in the case that a second predetermined threshold (T2) is met, the video data which was captured prior to step S705 by the designated least important camera/s and stored on the primary recording server 151 is deleted in order to release storage capacity so that more video data from the designated more important video camera (or cameras) can be stored on the primary recording server 151.

Fifth Embodiment

In a fifth embodiment the video surveillance system 100, further to the two-staged approach described in the fourth embodiment, includes a three-staged approach where the primary recording server 151 is monitored according to three predetermined thresholds T1, T2 and T3.

An operation of the three-staged approach is similar to that of the fourth embodiment illustrated in FIG. 7 except for the fact that it includes an additional (third) check of whether or not the storage capacity of the primary recording server 151 is equal to or less than a predetermined threshold.

For example, the additional threshold check might be included as the very first threshold T1 check, and in the case that it is determined that the storage capacity of the primary recording server 151 is less than the first threshold T1 the video data captured by the designated least important camera (or cameras) is reduced at the primary recording server 151 as a first-stage of reserving the primary recording server's 151 storage capacity for the designated most important camera (or cameras) at a time when the archive server 152 is unavailable.

According to the fifth embodiment, the remaining operational steps correspond to steps S705 to S710 of the fourth example in which two further storage capacity thresholds T2 and T3 (S705 and S708) are referenced and two further actions (S707 and S710) with respect to video data of the least designated camera/s are taken in order to preserve the primary recording server's 151 storage capacity for the designated most important camera/s at a time when the archive server 152 is unavailable.

Furthermore, it will be understood that any combination of the above-described thresholds (T1, T2 and T3) and video reduction measurements (reduction of frame rate for example, sacrificing of video data capture and deletion of stored video data) can be used in order to preserve storage space of the primary recording server 151 for the designated more important camera (or cameras) at a time when the archive server 152 is unavailable. Additionally, any number of thresholds and any number of video data reduction techniques may be implemented in order to preserve storage space of the primary recording server 151 for the designated more important camera (or cameras) at a time that the archive server 152 is unavailable.

Sixth Embodiment

According to a sixth embodiment of the video surveillance system 100, the amount of video data which is required to be stored on the primary server 151 at a time when the archive server 152 is unavailable is controlled in a manner which is different to the first embodiment.

In particular, in the sixth embodiment reduction of the video data before storing the reduced video data on the primary recording server 151 is performed by the cameras 161-162 instead of the primary recording server 151.

According to the first embodiment, captured video data is sent to the primary recording server 151 via network 121 and the primary recording server 151 would reduce the video data associated with the designated least important camera (or cameras) is stored on the primary recording server 151. Such a configuration places a large computational burden on the primary recording server 151.

Video data reduction according to the sixth embodiment, however, is performed by the cameras 161-162 reducing the captured video data before the video data is sent to the primary recording server 151.

With reference to FIGS. 3 and 5 the sixth embodiment will be explained. The operation of the sixth embodiment is similar to the previously explained first embodiment so the operational steps which are the same have not been reproduced for the sixth embodiment. Namely, operational steps S501 to S506 of FIG. 5 are the same for both the first embodiment and the sixth embodiment.

However, according to the sixth embodiment, in the case that the primary recording server 151 determines at step S505 of FIG. 5 that the storage capacity of the primary recording server 151 is equal to or less than a predetermined threshold (a "Yes" determination) the operation proceeds to step S507 in which the priority order of the plurality of cameras 161-162 as specified by the user is referenced and video data settings related to the video camera (or cameras) which is/are considered to be least important are changed in order to reduce the video data which is to be stored on the primary recording server 151.

In the sixth embodiment the primary recording server 151 sends to the designated least important camera (or cameras) a command which instructs the designated least important camera (or cameras) to reduce the video data by reducing, for example, frames per second, or frame rate. The command is received by the input/output port 350 and the command causes the processor 340 to change settings of the camera 300 such that the camera 300 performs a reduction in the frames per second at which video data is captured.

After camera 300 changes its settings in response to receiving the command from the primary recording server 151, the video data which is sent to be stored on the primary recording server 151 via the network 121 for storage at step S508 has been reduced at the source (cameras 161-162) rather than reduced by the primary recording server 151.

The sixth embodiment has been described as an alternative to the first embodiment but it should be understood that reducing the frames per second at the source (i.e. the designated least important camera) would impact upon the video data which is displayed as a "live stream" on client terminal 110. Accordingly, it is preferable that the reduction of frames per second is performed and managed at the primary recording server 151 such that there is no loss in quality on the "live stream" provided to client terminal 110 and the user's live viewing experience is therefore not reduced. However, in the case that the "live stream" is not so important to a user, this embodiment provides the advantages of reducing the amount of video data associated with a camera 161-162 according to priority settings designated by a user whilst reducing the operational burden on the primary recording server 151.

According to the video surveillance system 100 described above it is possible for a user to prioritize video sources in order to mitigate or avoid the likelihood of important video data being lost due to limited storage capacity of the primary recording server at a time when the archive server 152 is unavailable.

It should be noted that any of the threshold steps and values described in each of the embodiments might be adapted each time the storage capacity or remaining storage space of the primary recording server 151 satisfies the specified threshold. The setting of a new threshold value, lower than the previous threshold value, can be used as a threshold to determine whether or not data reduction techniques should be performed on the video data which is associated with the camera/s 161-162 having a designated priority position which is greater than that of the camera/s 161-162 whose video data has been reduced according to a previous threshold value. In other words, an iterative process of setting threshold values for camera/s 161-162 as ranked according to a priority order might be applied. It should be noted that in such a configuration the designated least important camera/s 161-162 will have their associated video data reduced according to their ranked priority as the storage capacity of the primary recording server 151 is reduced. Accordingly, the video data associated with the most important camera/s 161-162 is preserved, without undergoing video data reduction, whilst maximizing the storage potential of the primary recording server before data can be transferred to the archive server 152.

In the above described embodiments, it is described that the primary server 151 acts as an image data control means and performs the operational processing of the video surveillance system 100. In other words, it has been described that the processing illustrated in FIGS. 5, 6 and 7 is performed on the primary recording server 151 by virtue of the primary recording server 151 applying settings which have been received from the management server 130. However, it should be understood that the invention described in the present application should not be limited to such a configuration and the operational processing described might alternatively be performed on the management server 130, for example. Furthermore, the operational processing might be performed by any other means or unit that is suitable to perform such processing.

Furthermore, the configuration of embodiments one to six have all been described with reference to an archive server and maximizing the storage potential of a primary recording server which stores video data until the archive server becomes available again and the video data can then be transferred to the archive server for long term storage. Additionally, the described embodiments might also be implemented in the case that the primary recording server encounters disk space capacity problems whilst the archive server remains fully operational. In such a case it might also be necessary to maximize the available storage space capacity of the primary recording server until such problems are overcome.

In any event, it should be understood that the principle of maximizing storage space of a server can be applied to any video surveillance configuration and the principles for maximizing storage space according to an order of priority described in embodiments one to six can be equally applied to a system which has only one server for direct storage. In other words, the principles of maximizing storage as described above can be applied to a video surveillance system that does not include an archive server and these can simply be applied to a system which has only one storage server in order to maximize the storage space of that one server.

It should be understood that for each of the above-described embodiments the "live" stream of the video data captured by the cameras remains to be displayed on the client terminal even if video data captured by one of the cameras is not stored on the primary recording server. In other words, video data is always displayed "live" on the client terminal whereas the recording of the video data is optional. However, it is not the case that the "live" stream has to be displayed at all times, but a user of the video surveillance system should have the option so that it is always capable for the "live" stream to be displayed on the client terminal, regardless of whether or not the video data associated with that "live" stream is being recorded.

While the present invention has been described with reference to embodiments, it is to be understood that the invention is not limited to the disclosed embodiments. In other words, the present invention can be implemented in various forms without departing from the principal features of the present invention.

The scope of the following claims is to be accorded the broadest interpretation so as to encompass all such modifications and equivalent structures and functions.

The invention claimed is:

1. An apparatus configured to control a storage of image data captured by a plurality of image capturing devices, the apparatus comprising:
   a processor and a memory storing instructions that, when the instructions are executed by the processor, cause the processor to perform operations including:
   receiving a designation of importance for at least one of the plurality of image capturing devices, wherein a given image capturing device of the plurality of image capturing devices is identified as less important than other image capturing devices of the plurality of image capturing devices in accordance with the received designation of the importance,
   storing, in a first storage, the image data,
   determining availability of a second storage to which the image data stored in the first storage is to be transferred, and determining storage space available in the first storage, and
   transmitting a control command to the given image capturing device,
   wherein, in a case where it is determined that the second storage is unavailable and the available storage space in the first storage is determined to be less than a predetermined threshold, transmitting includes transmitting the control command to the given image capturing device to reduce an amount of image data which the given image capturing device captures, or transmitting includes transmitting the control command to the given image capturing device such that the image data captured by the given image capturing device is not newly stored in the first storage.

2. The apparatus according to claim 1, wherein transmitting includes transmitting the control command to the given image capturing device to change a frame rate of the image data captured by the given image capturing device before storing the frame-rate changed image data in the first storage.

3. The apparatus according to claim 1, wherein transmitting includes transmitting the control command to the given image capturing device to change an image resolution of the image data captured by the given image capturing device before storing the image-resolution changed image data in the first storage.

4. The apparatus according to claim 1, wherein transmitting includes transmitting the control command to the given image capturing device to change a compression ratio of the image data captured by the given image capturing device before storing the compression-ratio changed image data in the first storage.

5. The apparatus according to claim 1, wherein, in a case where the available storage space in the first storage is determined to be less than the predetermined threshold, a threshold value corresponding to the predetermined threshold is reduced and determining further includes determining an available storage space in the first storage with regard to the reduced threshold value.

6. The apparatus according to claim 5, wherein, in a case where the available storage space in the first storage is determined to be less than the reduced threshold value, transmitting includes controlling the other image capturing devices to reduce the amount of image data which the other image capturing devices captures, or transmitting includes controlling the other image capturing devices such that the image data captured by the other image capturing devices is not newly stored in the first storage.

7. A method for an apparatus configured to control a storage of image data captured by a plurality of image capturing devices, the method comprising:
   receiving a designation of importance for at least one of the plurality of image capturing devices, wherein a given image capturing device of the plurality of image capturing devices is identified as less important than other image capturing devices of the plurality of image capturing devices in accordance with the received designation of the importance;
   storing, in a first storage, the image data;
   determining availability of a second storage to which the image data stored in the first storage is to be transferred, and determining storage space available in the first storage; and
   transmitting a control command to the given image capturing device,
   wherein, in a case where it is determined that the second storage is unavailable and the available storage space in the first storage is determined to be less than a predetermined threshold, transmitting includes transmitting the control command to the given image capturing device to reduce an amount of image data which the given image capturing device captures, or transmitting includes transmitting the control command to the given image capturing device such that the image data captured by the given image capturing device is not newly stored in the first storage.

8. The method according to claim 7, wherein transmitting includes transmitting the control command to the given image capturing device to change a frame rate of the image data captured by the given image capturing device before storing the frame-rate changed image data in the first storage.

9. The method according to claim 7, wherein transmitting includes transmitting the control command to the given image capturing device to change an image resolution of the image data captured by the given image capturing device before storing the image-resolution changed image data in the first storage.

10. The method according to claim 7, wherein transmitting includes transmitting the control command to the given image capturing device to change a compression ratio of the image data captured by the given image capturing device before storing the compression-ratio changed image data in the first storage.

11. The method according to claim 7, wherein, in a case where the available storage space in the first storage is determined to be less than the predetermined threshold, a threshold value corresponding to the predetermined threshold is reduced and determining further includes determining an available storage space in the first storage with regard to the reduced threshold value.

12. The method according to claim 11, wherein, in a case where the available storage space in the first storage is determined to be less than the reduced threshold value, transmitting includes controlling the other image capturing devices to reduce the amount of image data which the other image capturing devices captures, or transmitting includes controlling the other image capturing devices such that the image data captured by the other image capturing devices is not newly stored in the first storage.

13. A non-transitory machine readable medium storing a program having computer readable instructions, which when run on a computer, causes the computer to carry out a method for an apparatus configured to control a storage of image data captured by a plurality of image capturing devices, the method comprising:
   receiving a designation of importance for at least one of the plurality of image capturing devices, wherein a given image capturing device of the plurality of image capturing devices is identified as less important than other image capturing devices of the plurality of image capturing devices in accordance with the received designation of the importance;
   storing, in a first storage, the image data;
   determining availability of a second storage to which the image data stored in the first storage is to be transferred, and determining storage space available in the first storage; and
   transmitting a control command to the given image capturing device,
   wherein, in a case where it is determined that the second storage is unavailable and the available storage space in the first storage is determined to be less than a predetermined threshold, transmitting includes transmitting the control command to the given image capturing device to reduce an amount of image data which the given image capturing device captures, or transmitting includes transmitting the control command to the given image capturing device such that the image data captured by the given image capturing device is not newly stored in the first storage.

14. The apparatus according to claim 1, wherein transmitting includes transmitting the control command to the given image capturing device such that the given image capturing device no longer captures the image data.

15. The apparatus according to claim 1, wherein transmitting includes transmitting the control command to the given image capturing device such that the given image capturing device no longer transmits the image data.

16. The apparatus according to claim 1, wherein the given image capturing device is identified as least important of the plurality of image capturing devices.

17. The method according to claim 7, wherein the control command is transmitted to the given image capturing device such that the given image capturing device no longer captures the image data.

18. The method according to claim 7, wherein the control command is transmitted to the given image capturing device such that the given image capturing device no longer transmit the image data.

19. The method according to claim 7, wherein the given image capturing device is identified as least important of the plurality of image capturing devices.

20. An apparatus configured to control a storage of image data captured by a plurality of image capturing devices, the apparatus comprising:
   a processor and a memory storing instructions that, when the instructions are executed by the processor, cause the processor to perform operations including:
   receiving a designation of importance for at least one of the plurality of image capturing devices, wherein a given image capturing device of the plurality of image capturing devices is identified as less important than other image capturing devices of the plurality of image capturing devices in accordance with the received designation of the importance,
   storing, in a first storage, the image data,
   determining availability of a second storage to which the image data stored in the first storage is to be transferred, and determining storage space available in the first storage, and
   controlling an amount of the image data already stored in the first storage or to be stored in the first storage,
   wherein, in a case where it is determined that the second storage is unavailable and the available storage space in the first storage is determined to be less than a predetermined threshold, controlling includes controlling the amount of the image data in the first storage to reduce the amount of the image data captured by the given image capturing device, or controlling includes controlling the amount of the image data in the first storage such that the image data captured by the given image capturing device is not newly stored in the first storage.

21. The apparatus according to claim 20, wherein controlling includes controlling the amount of the image data in the first storage by deleting the image data captured by the given image capturing device and having been stored in the first storage.

22. The apparatus according to claim 20, wherein controlling includes controlling the amount of the image data to be stored in the first storage (i) by changing a frame rate of the image data captured by the given image capturing device, (ii) by changing an image resolution of image data captured by the given image capturing device, or (iii) by changing a compression ratio of the image data captured by the given image capturing device.

23. The apparatus according to claim 20, wherein the given image capturing device is identified as least important of the plurality of image capturing devices.

24. A method for an apparatus configured to control a storage of image data captured by a plurality of image capturing devices, the method comprising:
   receiving a designation of importance for at least one of the plurality of image capturing devices, wherein a given image capturing device of the plurality of image capturing devices is identified as less important than other image capturing devices of the plurality of image capturing devices in accordance with the received designation of the importance;
   storing, in a first storage, the image data;

determining availability of a second storage to which the image data stored in the first storage is to be transferred, and determining storage space available in the first storage; and controlling an amount of the image data already stored in the first storage or to be stored in the first storage, wherein, in a case where it is determined that the second storage is unavailable and the available storage space in the first storage is determined to be less than a predetermined threshold, controlling includes controlling the amount of the image data in the first storage to reduce the amount of the image data captured by the given image capturing device, or controlling includes controlling the amount of the image data in the first storage such that the image data captured by the given image capturing device is not newly stored in the first storage.

25. The method according to claim 24, wherein controlling includes controlling the amount of the image data in the first storage by deleting the image data captured by the given image capturing device and having been stored in the first storage.

26. The method according to claim 24, wherein controlling includes controlling the amount of the image data to be stored in the first storage (i) by changing a frame rate of the image data captured by the given image capturing device, (ii) by changing an image resolution of image data captured by the given image capturing device, or (iii) by changing a compression ratio of the image data captured by the given image capturing device.

27. The method according to claim 24, wherein the given image capturing device is identified as least important of the plurality of image capturing devices.

28. A non-transitory machine readable medium storing a program having computer readable instructions, which when run on a computer, causes the computer to carry out a method for an apparatus configured to control a storage of image data captured by a plurality of image capturing devices, the method comprising:

receiving a designation of importance for at least one of the plurality of image capturing devices, wherein a given image capturing device of the plurality of image capturing devices is identified as less important than other image capturing devices of the plurality of image capturing devices in accordance with the received designation of the importance;

storing, in a first storage, the image data;

determining availability of a second storage to which the image data stored in the first storage is to be transferred, and determining storage space available in the first storage; and controlling an amount of the image data already stored in the first storage or to be stored in the first storage, wherein, in a case where it is determined that the second storage is unavailable and the available storage space in the first storage is determined to be less than a predetermined threshold, controlling includes controlling the amount of the image data in the first storage to reduce the amount of the image data captured by the given image capturing device, or controlling includes controlling the amount of the image data in the first storage such that the image data captured by the given image capturing device is not newly stored in the first storage.

\* \* \* \* \*